United States Patent Office 2,786,798
Patented Mar. 26, 1957

2,786,798

ANHYDRIDES OF MUCOCHLORIC ACID

Everett E. Gilbert, Morris Township, Morris County, and Edmund J. Rumanowski, Jersey City, N. J., assignors to Allied Chemical & Dye Corporation, New York, N. Y., a corporation of New York No Drawing. Application October 6, 1955,
Serial No. 539,006

6 Claims. (Cl. 167—33)

This invention relates to the production of new anhydrides of mucochloric acid which are useful in fungicidal preparations.

The new anhydrides of mucochloric acid are mucochloric-myristic anhydride and mucochloric-palmitic anhydride. These anhydrides may be prepared by reacting mucochloric acid with the corresponding acid chlorides. For example, mucochloric-myristic anhydride may be prepared by the reaction of mucochloric acid with myristoyl chloride in accordance with the following equation:

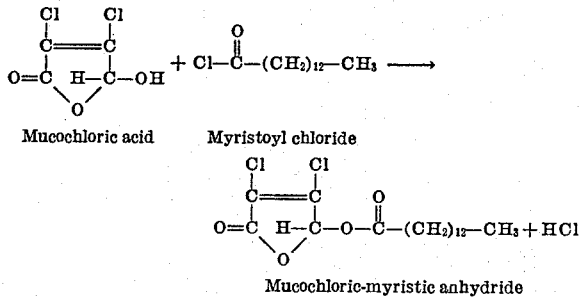

Mucochloric-palmitic anhydride may be produced by reacting mucochloric acid with palmitoyl chloride in accordance with the following equation:

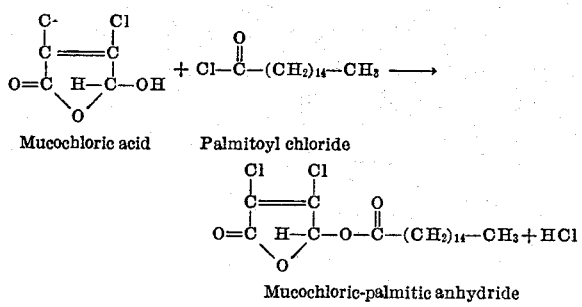

It is preferred to employ stoichiometric proportions of the two reactants in preparation of the desired mucochloric acid anhydrides. However, if desired, an excess of either of the reactants may be employed.

Although they are not necessary in the present reaction, inert solvents may be employed. Suitable inert solvents include xylene, chlorobenzene and naphtha. When the reaction is completed, the solvents so used may be recovered for reuse from the solid reaction product by simple filtration or by vacuum distillation.

During the reaction of mucochloric acid with the acid chlorides, by-product hydrogen chloride gas evolves. This gas may be recovered during reaction by any suitable method, as by absorption in a water trap.

The reaction of the present invention takes place at elevated temperatures in the order of about 50° to 125° C., preferably at temperatures of about 90° to 110° C.

Further, the reaction is carried out until no further by-product hydrogen chloride evolves, usually from about 3 to 7 hours.

The reaction products produced by combining mucochloric acid and myristoyl or palmitoyl chloride are impure solids. These products may be purified by simple recrystallization, as from ligroin (petroleum ether), alcohols such as methanol, aqueous alcohols, benzene, etc.

The purified reaction products are stable solids which have general utility as fungicides. More specifically, they are highly efficient for preventing and retarding fungus growth on organic materials. They may be applied directly to the material to be treated, but, since very small dosages are effective, they are preferably incorporated with a carrier.

Fungicidal dust formulations may be prepared by intimately mixing the anhydrides with materials such as talc, clay, fuller's earth, etc.

Spray formulations may be prepared by dissolving the anhydrides in a suitable organic solvent such as acetone, xylene, methylated naphthalenes and cyclohexanone. Dispersions of the anyhydrides, also suitable as sprays, may be prepared either by dispersing the anyhydrides in water or by dissolving the anhydrides in a solvent such as acetone and dispersing the resultant solution in water.

The following examples are given for the purpose of illustrating the present invention but are not intended to be limiting on the scope thereof. In the examples, parts are by weight where not otherwise specified.

Example 1.—34 parts of mucochloric acid were reacted with 49 parts of myristoyl chloride in a vessel equipped with a condenser and agitator. The reaction was carried out at a temperature of 100° to 110° C. for 7 hours. During the reaction by-product hydrogen chloride evolved and was absorbed in a water bath.

The reaction product was cooled, ground and then dried in air overnight. The dried material was dissolved in 275 parts of ligroin (petroleum ether) and then cooled in an ice bath with vigorous agitation until precipitation occurred. The resultant precipitate was isolated by filtration and yielded a purified product constituting 41 parts of mucochloric-myristic anhydride (M. P. 55.5° to 56.5° C.). The yield corresponded to 54% of theory.

Example 2.—34 parts of mucochloric acid were reacted with 55 parts of palmitoyl chloride in a vessel supplied with a condenser and agitator. The reaction was carried out at a temperature of 100° to 110° C. for 7 hours. By-product hydrogen chloride, evolved during the reaction, was collected in a water bath.

Following purification as in Example 1, 41 parts of purified product comprising mucochloric-palmitic anhydride (M. P. 63° to 64° C.) was obtained. This yield corresponded to 51% of theory.

The valuable application of mucochloric-myristic anhydride and mucochloric-palmitic anhydride as fungicides and particularly as protectants of organic materials against attack by fungi is shown by the following examples:

Example 3.—1% acetone solutions of mucochloric-myristic anhydride and mucochloric-palmitic anhydride were diluted 9 times their volume with water. The resultant solutions were sprayed on apple plants as protectants against apple scab. In the case of the mucochloric-myristic anhydride, only 1% of the leaf area was infected with apple scab, while in the case of the mucochloric-palmitic anhydride, no part of the leaf area was infected. Furthermore, no apparent injury to the apple plants resulted by application of these chemicals.

Example 4.—2 pounds of 50% powder formulations of mucochloric-myristic anhydride and mucochloric-palmitic anhydride were dispersed in 100 gallons of water. These formulations were sprayed on tomato plants as protectants against tomato late blight. Both of the formulations effectively controlled the late blight, and no defoliation or injury to the tomato plants resulted.

*Example 5.*—Mucochloric-acetic anhydride was prepared in known manner by the reaction of mucochloric acid with acetic anhydride. A 1% acetone solution of the anhydride was diluted 9 times its volume with water and was sprayed on apple plants and tomato plants as a protectant against apple scab and tomato late blight. In the case of the apple plants, 32% of the leaf area was infected with apple scab following application of the mucochloric-acetic anhydride. With respect to the tomato plants, 50% defoliation occurred as well as some injury to the tomato plant itself due to application of the chemical.

Example 5 shows that mucochloric-acetic anhydride, as contrasted to its homologues, mucochloric-myristic anyhydride and mucochloric-palmitic anhydride, exhibits poor protective value with respect to control of apple scab and tomato late blight.

Since various changes and modifications may be made in the invention without departing from the spirit thereof, the invention is deemed to be limited only by the scope of the appended claims.

We claim:

1. A compound of the group consisting of mucochloric-myristic anhydride and mucochloric-palmitic anhydride.

2. Mucochloric-myristic anhydride.

3. Mucochloric-palmitic anhydride.

4. A fungicidal composition containing as its active ingredient a compound of the group consisting of mucochloric-myristic anhydride and mucochloric-palmitic anhydride and a carrier therefor.

5. A fungicidal composition containing as its active ingredient mucochloric-myristic anhydride and a carrier therefor.

6. A fungicidal composition containing as its active ingredient mucochloric-palmitic anhydride and a carrier therefor.

References Cited in the file of this patent

UNITED STATES PATENTS

| | | |
|---|---|---|
| 2,226,183 | Staud et al. | Dec. 24, 1940 |
| 2,591,589 | Mowry | Apr. 1, 1952 |
| 2,636,840 | Brown | Apr. 28, 1953 |

OTHER REFERENCES

Mowry: J. Am. Chem. Soc., vol. 72, pp. 2535–7 (1950).